US010247949B2

(12) United States Patent
Kartal et al.

(10) Patent No.: US 10,247,949 B2
(45) Date of Patent: Apr. 2, 2019

(54) METHOD FOR ADJUSTING A DISPLAY DEVICE

(71) Applicant: Carl Zeiss Smart Optics GmbH, Aalen (DE)

(72) Inventors: Ersun Kartal, Aalen (DE); Karsten Lindig, Erfurt (DE); Torsten Braendle, Aalen (DE); Manfred Maul, Aalen (DE); Norbert Kerwien, Moegglingen (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 15/304,756

(22) PCT Filed: Apr. 16, 2015

(86) PCT No.: PCT/EP2015/058272
§ 371 (c)(1),
(2) Date: Oct. 17, 2016

(87) PCT Pub. No.: WO2015/158827
PCT Pub. Date: Oct. 22, 2015

(65) Prior Publication Data
US 2017/0038594 A1 Feb. 9, 2017

(30) Foreign Application Priority Data
Apr. 17, 2014 (DE) .......... 10 2014 207 488

(51) Int. Cl.
*G02C 5/08* (2006.01)
*G02C 7/08* (2006.01)
(Continued)

(52) U.S. Cl.
CPC ..... *G02B 27/0176* (2013.01); *G02B 27/0172* (2013.01); *G02C 5/08* (2013.01);
(Continued)

(58) Field of Classification Search
CPC ............ G02B 27/0172; G02B 27/0101; G02B 27/0149; G02B 27/145; G02B 27/0103;
(Continued)

(56) References Cited

U.S. PATENT DOCUMENTS 4,405,212 A * 9/1983 Cooper .................... A61F 9/02
2/440
6,480,174 B1 11/2002 Kaufmann et al.
(Continued)

FOREIGN PATENT DOCUMENTS

DE 102010041343 A1 3/2012
JP 2005173091 A 6/2005
(Continued)

OTHER PUBLICATIONS

International Preliminary Report on Patentability rendered by the International Bureau of WIPO for PCT/EP2015/058272, dated Oct. 27, 2016, 14 pages (including English translation).
(Continued)

*Primary Examiner* — Dawayne Pinkney
(74) *Attorney, Agent, or Firm* — Skaar Ulbrich Macari, P.A.

(57) ABSTRACT

A method for adjusting a display device with a holder that can be fitted on the head of a user includes a front section in which two spectacle lenses are arranged which are connected to each other via a central part, an imaging unit secured to the holder, which generates an image, and an imaging optical system secured to the holder which, when the holder is fitted on the head of the user, images the generated image into an exit pupil such that the user can perceive it as a virtual image with his first eye. The first spectacle lens with the coupling-out section is positioned in such a way that the exit pupil of the imaging optical system
(Continued)

coincides at least partially with the pupil of the first eye of the user when the holder is fitted on the head of the user.

10 Claims, 6 Drawing Sheets

(51) Int. Cl.
  *G02B 27/01* (2006.01)
  *G02C 11/00* (2006.01)
  *G02C 13/00* (2006.01)

(52) U.S. Cl.
  CPC .......... *G02C 11/10* (2013.01); *G02C 13/001* (2013.01); *G02B 2027/0154* (2013.01); *G02B 2027/0161* (2013.01); *G02B 2027/0178* (2013.01); *G02C 7/086* (2013.01)

(58) Field of Classification Search
  CPC ......... G02B 27/01; G09F 19/18; G03B 21/00; G03B 21/14; A61B 3/103; A61B 3/14; A61B 3/113; A61B 3/1225; G09G 3/003
  USPC ...... 359/630–634, 13–14; 349/11; 310/49 R, 310/156.32, 156.33, 156.34, 156.35, 310/266–268, 156.02; 345/7, 9; 351/200, 205–206, 210, 221; 340/438, 340/980, 995.1, 815.47, 815.74
  See application file for complete search history.

(56) References Cited

U.S. PATENT DOCUMENTS

| | | | |
|---|---|---|---|
| 2011/0205487 A1 | 8/2011 | Sauer et al. | |
| 2012/0242561 A1* | 9/2012 | Sugihara | G02B 27/0172 345/8 |
| 2013/0050642 A1* | 2/2013 | Lewis | A61B 3/113 351/204 |
| 2013/0322683 A1 | 12/2013 | Jacobs | |
| 2015/0260992 A1* | 9/2015 | Luttmann | G02B 27/0172 359/631 |

FOREIGN PATENT DOCUMENTS

| | | |
|---|---|---|
| JP | 2010243786 A | 10/2010 |
| JP | 2011075956 A | 4/2011 |
| WO | 2010017955 A1 | 2/2010 |
| WO | 2010110301 A1 | 9/2010 |

OTHER PUBLICATIONS

Bernhard Kress and Thad Starner, "A Review of HMD Technologies and Applications for Consumer Electronics", Proc. SPIE vol. 8720-87200A-1, 13 pages.

Ozan Cakmakci and Jannick Rolland, "Head-Worn Displays: A Review", Journal of Display Technology, vol. 2, No. 3, Sep. 2006, 18 pages.

http://www.zeiss.com/vision-care/en_de/products-services/dispensing-tools-and-instruments-by-zeiss/lens-fitting-and-consultation.html, undated, 3 pages.

\* cited by examiner

METHOD FOR ADJUSTING A DISPLAY DEVICE

PRIORITY

This application claims the benefit of German Patent Application No. 102014207488.6 filed on Apr. 17, 2014, which is hereby incorporated herein by reference in its entirety.

FIELD

The present invention relates to a method for adjusting a display device with a holder that can be fitted on the head of a user, which comprises a front section in which two spectacle lenses are arranged which are connected to each other via a central part, an imaging unit secured to the holder, which generates an image, and an imaging optical system secured to the holder which, when the holder is fitted on the head of the user, images the generated image into an exit pupil such that the user can perceive it as a virtual image with his first eye, wherein the first spectacle lens is part of the imaging optical system and the generated image is guided in the first spectacle lens and is coupled out of the first spectacle lens via a coupling-out section.

BACKGROUND

With display devices, there is the difficulty that as a rule the position of the coupling-out section cannot be changed in the horizontal direction or relative to a first lateral end of the front section because otherwise the image guidance in the spectacle lens and the necessary coupling-out is optically significantly impaired.

Furthermore, there is the further difficulty that the size of the eyebox (the area in which the user's eye can move and he can still see the generated image as a virtual image) provided by the imaging optical system has an extent in the horizontal direction (i.e. in a direction from the first to a second lateral end of the front section) of approx. 5 mm. For a good possibility of perceiving the virtual image, it is therefore necessary for the eyebox (or the exit pupil of the imaging optical system) to be made to cover the pupil of the user's eye as completely as possible when the holder is fitted on the head.

Because of the anatomical differences between different users, however, as a rule the distance from temple to pupil of the eye and the interpupillary distance is different, with the result that it is difficult to reliably achieve this coverage in the case of different users.

SUMMARY

An object of the invention is to provide an adjustment method such that the described difficulties can be overcome as completely as possible.

A first spectacle lens with the coupling-out section can be positioned in such a way that the exit pupil of the imaging optical system (or the eyebox) coincides at least partially with the pupil of the first eye when the holder is fitted on the head of the user.

This ensures that the user can perceive the virtual image.

In particular, the exit pupil is arranged or positioned along a first direction which runs from a first to a second lateral end of the front section by the positioning of the first spectacle lens.

In the adjustment method according to an example of the invention, for the positioning, a first spectacle lens can be selected from a set of first spectacle lenses which in each case have a coupling-in section via which the generated image can be coupled into the respective first spectacle lens, and which differ by different distances of the coupling-out section from the coupling-in section, and the selected first spectacle lens can be secured in the front section.

Thus, only one set of different first spectacle lenses needs to be provided which can all be optimized individually in optical respects. The display device can then be adjusted optimally to the respective user through the selection of the suitable spectacle lens or of the spectacle lens with the suitable length between the coupling-in and coupling-out section.

Furthermore, for the positioning, a lateral edge of the first spectacle lens can be ground down. The spectacle lens is thus countersunk into the holder or the corresponding mount of the holder.

Furthermore, for the positioning, the distance between the two spectacle lenses can be altered. Thus, for example, the central part can be formed in such a way that its extent in the direction from the first to the second spectacle lens can be changed. For this, the central part can be formed e.g. in a telescopic way. Any other type of design with which the desired alterability is achieved is also possible.

In the adjustment method according to an example of the invention, for the positioning, a front section can be selected from a set of front sections which differ by the predetermined distance which the spectacle lenses have when they are arranged therein and the first spectacle lens can be arranged in the selected front section.

Furthermore, it is possible, for the positioning, for a central part to be selected from a set of central parts which differ by the predetermined distance which the spectacle lenses have when they are connected to the central part and the two spectacle lenses can be connected to the selected central part.

In addition, it is possible to adjust a first angle between a first temple which is connected to the front section and a front section, wherein the first angle is present when the user wears the display device on his head. It is also possible to position the coupling-out section in the direction from the first to the second lateral end of the front section in this way.

Furthermore, it is possible to adjust or change an angle which the two spectacle lenses form in order to position the first spectacle lens in the desired way.

For this, the central part can comprise a pivot joint which connects the two spectacle lenses to each other in such a way that the angle between the two spectacle lenses can be adjusted (or altered), with the result that, by changing the angle between the two spectacle lenses, the exit pupil can be positioned along a first direction which runs from the first to the second lateral end.

An adaptation to the anatomically determined distance between temple and pupil and/or to the anatomically determined interpupillary distance of a specific user is thus easily possible. The positioning of the exit pupil is a consequence of the change of direction of the light coming from the coupling-out section for imaging because of the change of the angle between the two spectacle lenses. This change in direction can lead to a movement of the exit pupil on a circular path. Such a movement comprises a movement portion in the first direction, with the result that a positioning of the exit pupil along the first direction is possible.

The pivot joint can comprise a fixing unit which fixes the adjusted angle between the two spectacle lenses and thus the adjusted angle of rotation of the joint.

The fixing unit can bring about the fixing by means of friction locking and/or positive locking. In particular, the fixing unit can comprise different engagement positions for the pivot joint, with the result that different values of the angle between the two spectacle lenses can be adjusted and fixed.

The pivot joint is, in particular, formed such that a change in the angle between the two spectacle lenses of at most 26° (e.g. ±13°) or 20° (e.g. ±10°) is possible. With an angle range of e.g. ±6°, an adaptation for interpupillary distances of from 55 to 75 mm can be carried out. The pivot joint can be formed such that a larger change in the angle is not possible. In other words, the range of the angle of rotation predetermined by the pivot joint is 26° or 20°. In particular, the predetermined range of the angle of rotation can be 15°, 12°, 10° or 5°.

In a display device example, the holder can comprise a first temple which is connected in an articulated manner to the first lateral end of the front section and a second temple which is connected in an articulated manner to the second lateral end of the front section.

The two temples can extend away from the front section in the same direction, with the result that the holder is essentially U-shaped seen in top view onto a first reference plane.

The axis of rotation of the first pivot joint can extend perpendicular to the first reference plane.

The articulated connection of the first temple to the first lateral end of the front section can be realized via a second pivot joint and the articulated connection of the second temple to the second lateral end of the front section can be realized via a third pivot joint.

The axes of rotation of the second and third pivot joint can preferably extend perpendicular to the first reference plane.

Furthermore, the central part can be formed deformable. In this case, the positioning of the first spectacle lens can take place by a deformation of the central part. In particular, the deformation can be carried out in such a way that the deformed state of the central part stays in effect on a long-term basis.

The display device can comprise further elements known to a person skilled in the art which are necessary for its operation.

In particular, after the change in the angle, the pivot joint can be fixed against a further alteration. It is possible, in particular, for the fixing to be present automatically after the end of the process of changing the angle.

The positioning of the first spectacle lens can be carried out in dependence on a supplied value of a measurement parameter which characterizes the distance between the first eye of the user and the nearer temple of the user, the distance between the two pupils of the user's eyes and/or the distance from the first eye of the user to his nearer ear.

It is understood that the features named above and those yet to be explained below can be used not only in the stated combinations but also in other combinations or alone, without departing from the scope of the present invention.

Figure 1:
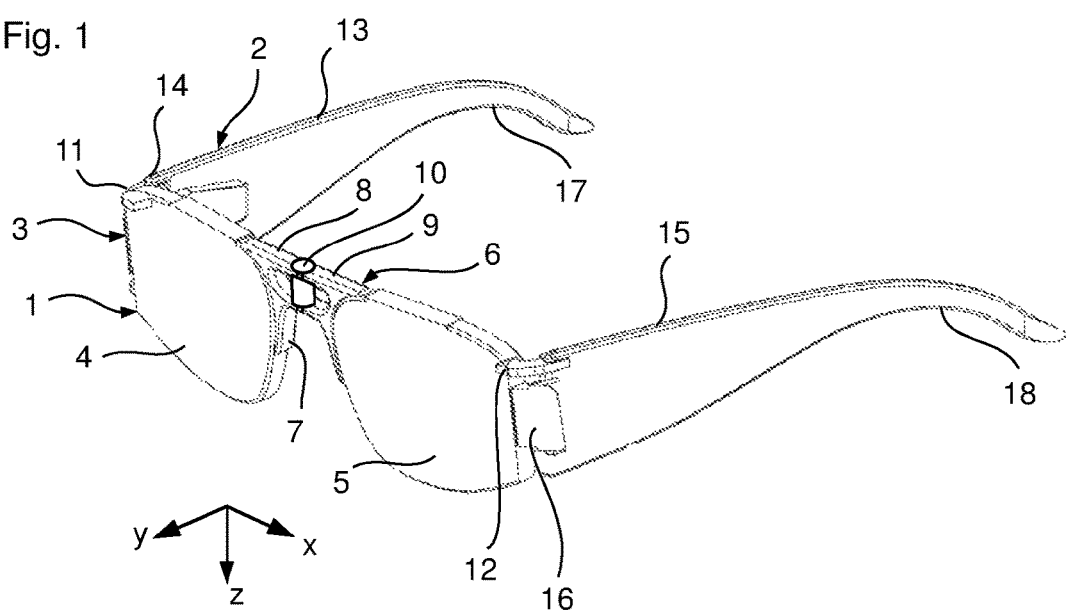
FIG. 1 is a schematic perspective representation of an embodiment of the display device according to an embodiment of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In FIG. 1, an embodiment of a display device 1 is shown which is suitable for the adjustment method according to the invention described below. First of all, the display device 1 is described in more detail.

The display device 1 comprises a holder in the form of a spectacles-type frame 2 that can be fitted on the head of a user. The frame 2 comprises a front section 3 in which a first spectacle lens 4 and a second spectacle lens 5 are secured or held.

In addition, the front section 3 comprises a central part 6, the lower end 7 of which is formed as a nose pad. Furthermore, the central part 6 is formed in two parts, wherein the two parts 8, 9 of the central part 6 are connected to each other via a pivot joint 10.

The front section 3 further comprises a first lateral end 11 and a second lateral end 12. A first temple 13 is secured to the first lateral end 11 of the front section 3 via a second pivot joint 14. Furthermore, a second temple 15 is secured to the second lateral end 12 of the front section 3 via a third pivot joint 16.

The two temples 13, 15 can be formed in a conventional way as temple stems the ends 17, 18 of which, which point away from the front section 3, are formed to rest on the ear of a user.

The display device 1 can be formed e.g. as sports glasses, sunglasses and/or glasses for correcting defective vision, wherein a virtual image can be reflected into the user's field of view via the first spectacle lens 4, as is described below.

Figure 2:
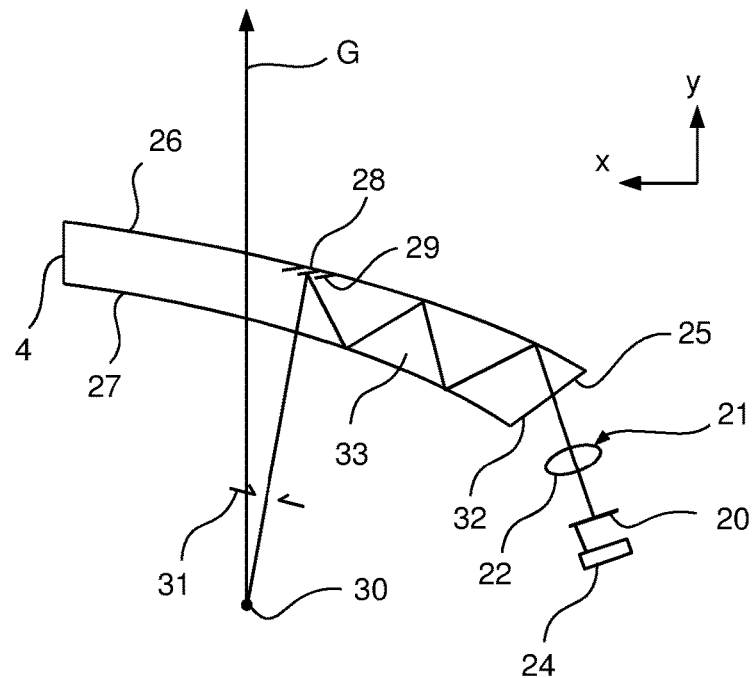
FIG. 2 is an enlarged detailed sectional view of the first spectacle lens.

As can best be seen from the enlarged partial sectional view in FIG. 2, the display device 1 additionally comprises an imaging unit 20 (which comprises e.g. an OLED module) with which an image can be generated that is to be reflected into the user's field of view as the virtual image. In order to bring this about, the display device 1 further comprises an imaging optical system 21 which contains an optical element 22 arranged between the imaging unit 20 and the first spectacle lens 4. In addition, a part of the first spectacle lens 4 itself also serves as part of the imaging optical system 21.

The imaging unit 20 is formed, for example, as a two-dimensional imaging system with a plurality of pixels arranged e.g. in columns and rows, wherein a light bundle 23 can emerge from each pixel. The desired image can be generated by correspondingly actuating the pixels by means of a control unit 24. In FIG. 2, the beam path of a light beam is drawn in to represent the light bundles 23, with the result that the light beam 23 is discussed below.

The light beam 23 emerging from the imaging unit 20 runs through the optical element 22 and enters the first spectacle lens 4 via an end face 25 of the first spectacle lens 4 and is then guided in the first spectacle lens 4 to a coupling-out section 28 by total internal reflection on the front and rear side 26, 27 of the first spectacle lens 4. Alternatively, it is possible to couple the light beam 23 into the first spectacle lens via the rear side 27. The coupling-out section 28 comprises several reflective deflecting surfaces 29 or reflective facets 29 arranged next to each other which deflect the light beam 23 in the direction of the rear side 27 such that it exits the first spectacle lens 4 via the rear side 27.

Thus, when a user is wearing the display device 1 according to the invention on his head as intended, he can perceive the image generated by means of the imaging unit 20 as a virtual image when he looks in the direction of the coupling-out section 28. In the embodiment described here, the user must look slightly towards the right (here 25°) relative to the direction of view G of a forward view. In FIG. 2, the centre of rotation 30 of the user's eye and the eyebox 31 or the exit pupil 31 (the area which is provided by the display device 1 and in which the user's eye can move and he can still see the generated image as a virtual image) is drawn in for clarification. The eyebox 31 can also be referred to as exit pupil 31 of the imaging optical system 21.

The section of the first spectacle lens 4 via which the light beam 23 is coupled into the first spectacle lens 4 can also be referred to as coupling-in section 32. The corresponding sections of the front and rear side 26, 27 of the first spectacle lens 4 between the coupling-in section 32 and the coupling-out section 28 on which the total internal reflection takes place thus serve as light guiding channel 33 which guides the light beams 23 coupled-in via the coupling-in section 32 and the coupled-in image to the coupling-out section 28.

Figure 3:
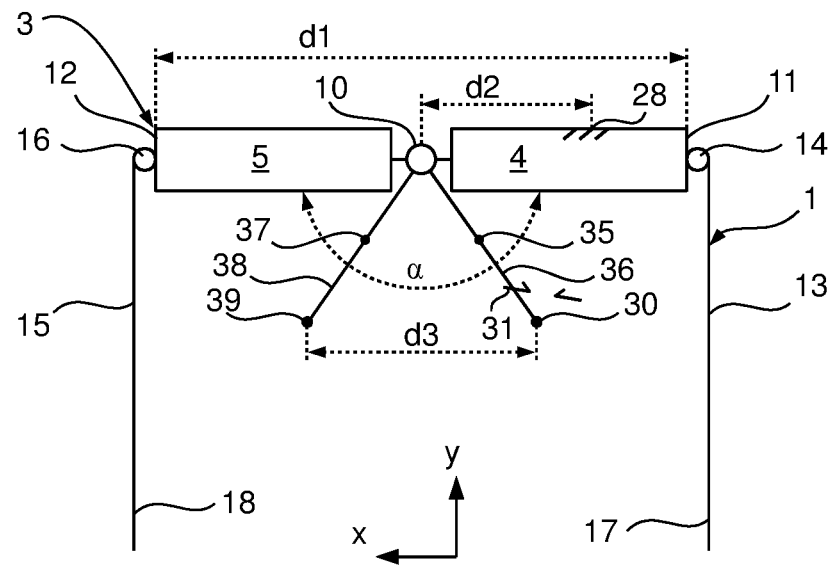
FIG. 3 is a schematic top view of the display device according to an embodiment of the invention with a first angle value between the two spectacle lenses.
Figure 4:
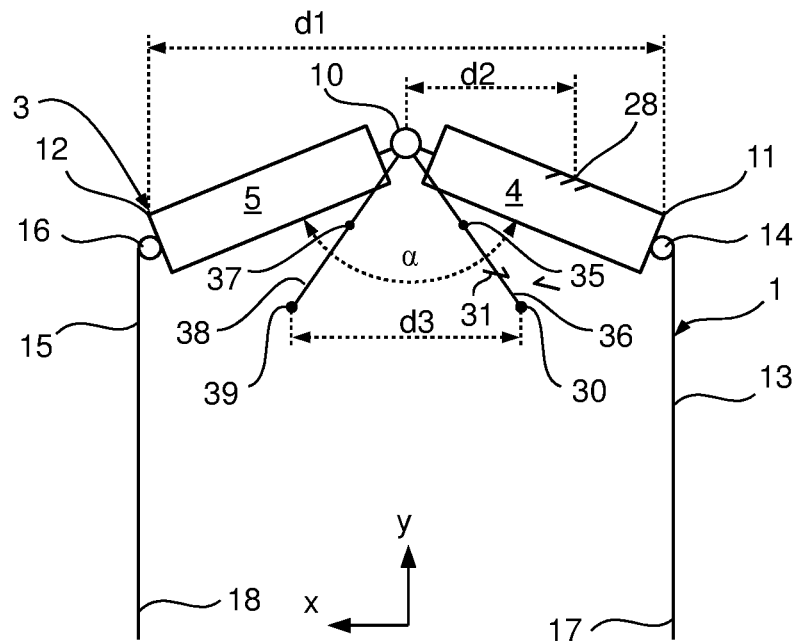
FIG. 4 is a representation according to FIG. 3 with a second angle value of the angle between the two spectacle lenses.
Figure 5:
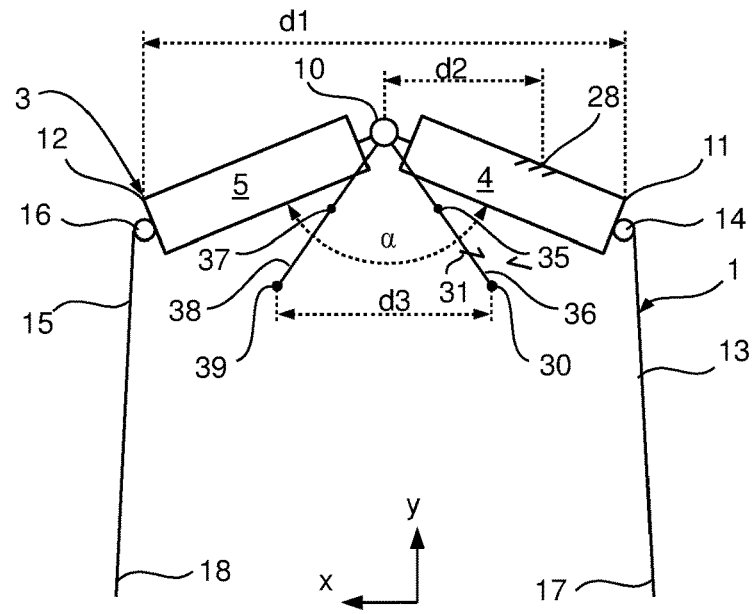
FIG. 5 is a representation according to FIG. 4 with temples not running parallel.

In FIGS. 3 to 5, the display device 1 according to the invention is represented in top view greatly simplified (e.g. the imaging unit 20, the control unit 24 and the optical element 22 are not drawn in) in order to describe the possibility of positioning the coupling-out section 28 in a direction from the first lateral end 11 to the second lateral end 12 (x-direction). As can be learned from these representations, in top view the holder 2 is formed U-shaped.

In the angular position of the pivot joint 10 shown in FIG. 3 an angle α, which the two spectacle lenses 4, 5 form, is 180°. This means that the distance d1 from the first lateral end 11 to the second lateral end 12 has its maximum value. In the same way, the distance d2 from the coupling-out section 28 to the axis of rotation of the pivot joint 10 in the direction from the first lateral end 11 to the second lateral end 12 (i.e. in the x-direction) has its maximum value.

If the angle α which the two spectacle lenses 4, 5 form is now reduced, as is shown in FIG. 4, this leads to the distances d1 and d2 also becoming smaller. In other words, the eyebox 31 is thereby moved in the x-direction (here towards the pivot joint) and can thus be displaced or moved in this direction by adjusting the angle α between the two spectacle lenses 4, 5. More precisely, by changing the angle α, the eyebox 31 or the exit pupil 31 of the imaging optical system 21 is moved on a circular path. This movement comprises a portion in the x-direction which is used for the positioning. The position of the eyebox 31 can thus be adapted to different distances between the nose and the right eye and/or the interpupillary distance of different users in the display device 1 according to the invention.

In the representation according to FIG. 4, the two temples 13, 15 are parallel to each other in the same way as in the representation from FIG. 3. This means that the width of the head of the user is smaller in the adjustment according to FIG. 4. However, this does not have to be the case. Nor do the temple stems 13, 15 have to run parallel, as is indicated schematically in FIG. 5. In the adjustment according to FIG. 5, the distance of the two ends 17, 18 of the two temples 13, 15 is thus the same as in the case of the adjustment according to FIG. 3, wherein, however, the angle α corresponds to the adjustment according to FIG. 5.

The adjustment of the angle α between the two spectacle lenses 4, 5 can also be understood such that only the pivot joint 10 is moved in the y-direction (i.e. in the direction perpendicular to the x-direction) and the position of the second and third pivot joint 14, 16 remains unchanged in this y-direction. This then leads to the width d1 decreasing and at the same time the angle α between the two spectacle lenses 4, 5 decreasing.

The described change or adjustment of the angle α corresponds, for the first spectacle lens 4, to a rotation about an axis of rotation 35 which runs perpendicular to the top views according to FIGS. 3 to 5, wherein the axis of rotation 35 cuts an imaginary connecting line 36 from the centre of rotation 30 of the eye to the axis of rotation of the pivot joint 10. The intersection preferably lies exactly in the centre of the connecting line 36.

The same applies for the second spectacle lens 5. This also makes a rotation about an axis of rotation 37 which cuts an imaginary connecting line 38 from a centre of rotation 39 of the left eye to the axis of the pivot joint 10 (preferably in the centre). Because of the symmetrical construction of spectacle lenses 4, 5 with pivot joint 10, the rotation of the second spectacle lens 5 is directly opposed to the rotation of the first spectacle lens 4.

The distance d3 of the two centres of rotation 30, 39 corresponds to the interpupillary distance of the user.

On the rotation of the first spectacle lens 4, the direction from which the virtual image can be detected also varies correspondingly. However, this is not disruptive for the user since for this he must only look slightly further towards the right or left in order to perceive the virtual image. The angle relative to the direction of view G of the forward view is then no longer 25° but is slightly larger or slightly smaller.

Figure 6:
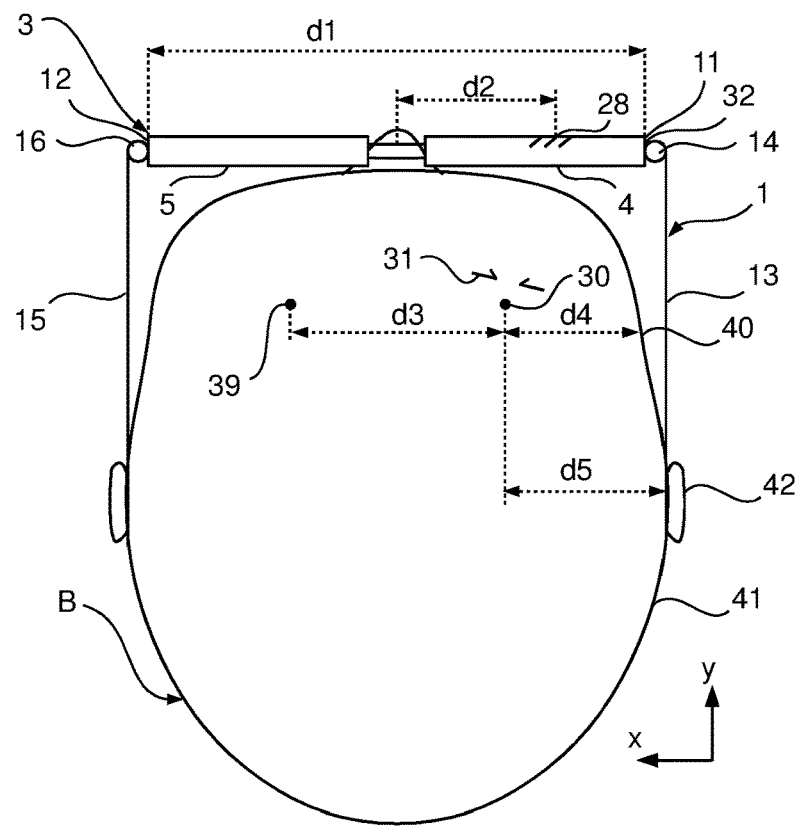
FIG. 6 is a schematic top view of a further embodiment of the display device.

In FIG. 6, a top view of a further embodiment of the display device 1 is represented in a similar way to in FIG. 3, wherein, however, the head 41 of the user B is also represented schematically. In the representation shown in FIG. 6, a distance d3 between the two centres of rotation 30 and 39 and thus an interpupillary distance d3 of 65 mm is assumed.

In contrast to the previously described embodiment of the display device 1, in the embodiment shown in FIG. 6 the central part 6 is formed without a pivot joint. An adaptation to the interpupillary distance d3 can take place e.g. by selecting the first spectacle lens 4 from a set of first spectacle lenses 4 which differ by the distance between the coupling-out section 28 and the coupling-in section 32. Thus, e.g., in the embodiment according to FIG. 6, a first spectacle lens 4 is chosen which is suitable for an interpupillary distance d3 of 65 mm.

Figure 7:
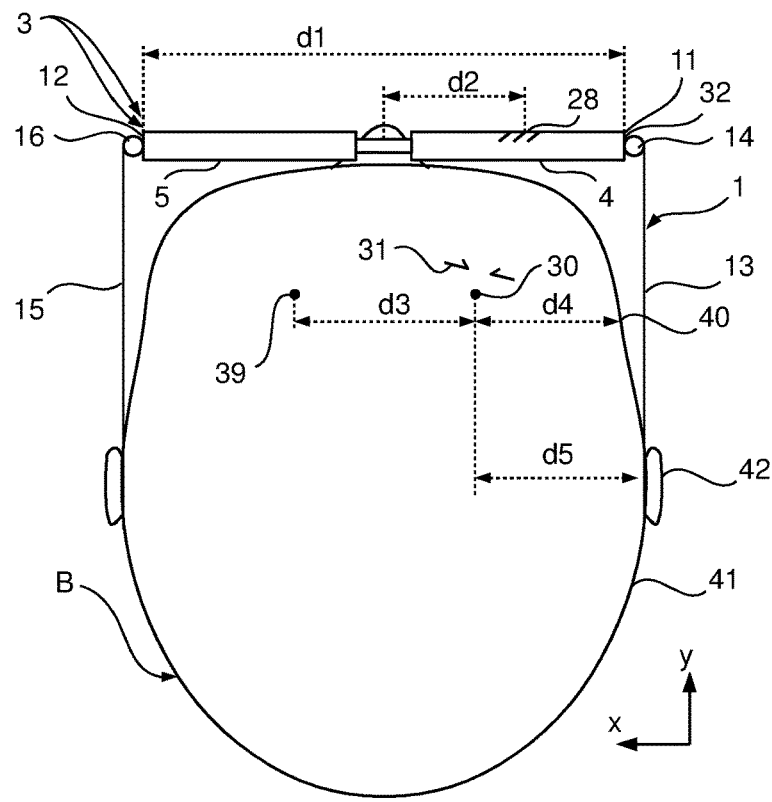
FIG. 7 is a top view according to FIG. 6 in which another first spectacle lens is used.

In FIG. 7, in the same way as in FIG. 6, a further embodiment of the display device 1 is shown, wherein the embodiment according to FIG. 7 differs from the embodiment according to FIG. 6 by the selection of another first spectacle lens 4. The first spectacle lens 4 according to FIG. 7 comprises a greater distance between coupling-in section 32 and coupling-out section 28 in comparison with the distance between coupling-in section 32 and coupling-out section 28 of the spectacle lens in FIG. 6. As a result, the distance d2 in FIG. 7 is smaller than in FIG. 6, which leads to a different position of the exit pupil 31. In FIG. 7 this is further to the left (in the x-direction) than in FIG. 6, with the result that the pupil of the eye (indicated by the centre of rotation of the eye 30) coincides at least partially with the exit pupil 31 (or the eyebox 31).

Therefore, the display device 1 according to FIG. 7 is suitable for an interpupillary distance d3 of 55 mm.

Thus, in the embodiments according to FIGS. 6 and 7, according to the adjustment method according to the invention, a first spectacle lens 4 is selected from a set of first spectacle lenses which differ by their distance from coupling-in section 32 to coupling-out section 28 and then the selected first spectacle lens 4 is connected to the central part 6 or arranged in a suitable way in the front section 3. Thus, the display device 1 is adapted to or adjusted for the specific user B.

In the procedure described here, the adjustment takes place in dependence on the actual interpupillary distance d3 of the user. The adjustment can be carried out in dependence on the measured interpupillary distance d3. In particular, the adjustment method can also contain the step of measuring the interpupillary distance d3.

Of course, it is also possible to adjust the display device 1 in dependence on other measurement parameters. Thus, for example, the distance d4 between the first eye (or the centre of rotation 30) and the corresponding temple 40 of the head 41 of the user B can be used as parameter in dependence on which the adjustment in the display device 1 is carried out. Of course, this distance d4 can also be measured in advance. The distance d4 is preferably measured or determined in the x-direction (i.e. in the direction from the first lateral end 11 to the second lateral end 12 of the front section 3).

Alternatively or in addition, the distance d5 from the first eye (or the first centre of rotation 30) to the point where the first temple 13 rests on the corresponding ear 42 of the user B can also be used as parameter in dependence on which the adjustment of the display device 1 is carried out. The distance d5 is determined in the x-direction and can be measured or ascertained in another way before the adjustment.

Figure 8:
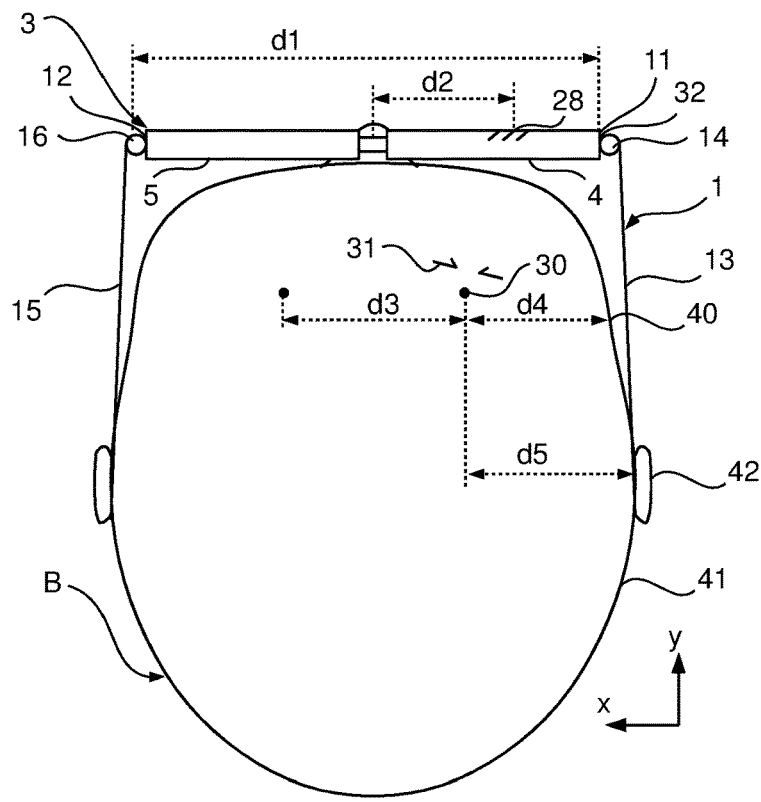
FIG. 8 is a top view according to FIG. 6 according to a further embodiment of the display device.

In FIG. 8, a modification of the embodiment according to FIG. 6 is represented. In this modification, the central part 6 is formed in such a way that its extent in the x-direction can be changed. In other words, the distance between the two spectacle lenses 4, 5 in the x-direction can be changed and adjusted. In particular, this change in distance is carried out symmetrically with respect to the central part 6, with the result that the first spectacle lens 4 is displaced in the x-direction by half of the change in distance and thus the coupling-out section 28 is also displaced and positioned in the x-direction. As a result, in turn, an adjustment of the display device in the desired way for the adaptation (overlap the exit pupil 31 with the pupil of the eye of the user B) to the specific user B can be carried out.

Thus, in the embodiment according to FIG. 8, there is an interpupillary distance d3 of 55 mm. However, the first spectacle lens 4 according to FIG. 6 is provided in the display device 1. Because it is assumed in the example described here that the width of the head 41 is the same as in FIG. 6, the temples 13 and 15 no longer run parallel to each other, but rather their distance increases as the distance from the front section 3 increases.

Figure 9:
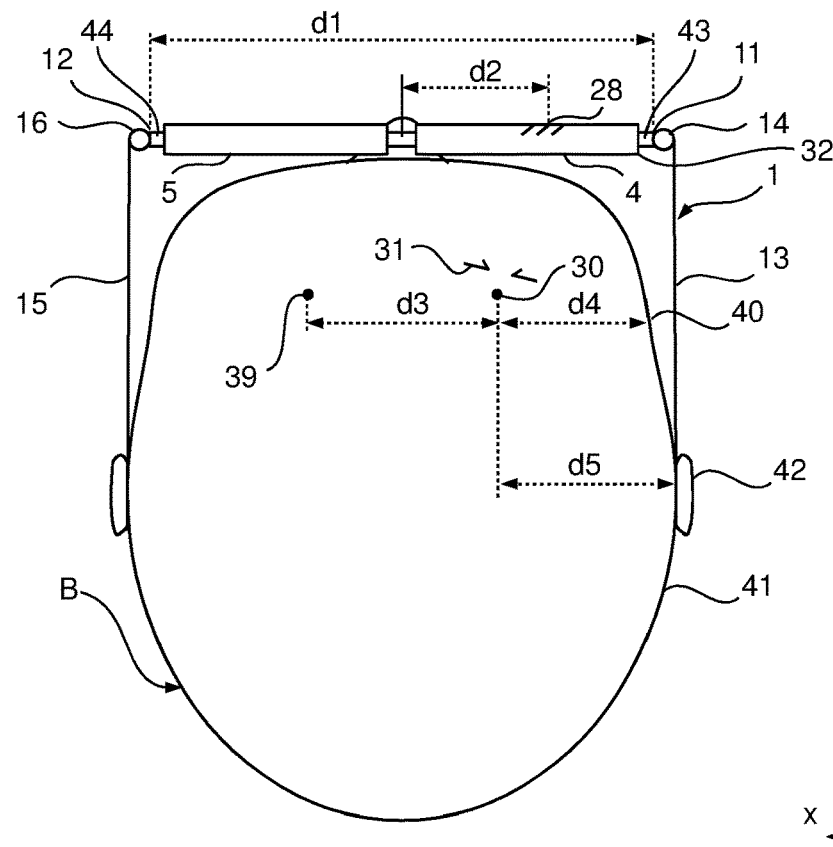
FIG. 9 is a top view according to FIG. 6 according to a further embodiment of the display device.

Of course, the front section 3 can also be formed in such a way that a change in distance by means of the central part 6 does not lead to a different width in the x-direction of the display device 1. In other words, care is taken that the temples 13, 15 always run parallel to each other, as is represented schematically in FIG. 9. For this, two side parts 43, 44 are provided on the front section 3 which bring about the corresponding width compensation.

The central part 6 can be formed in a telescopic way. It is also possible to provide longitudinal holes running in the x-direction in the central part 6, with the result that it is possible to adapt the distance by correspondingly positioning the mounting part for the corresponding spectacle lens 4, 5 in the central part or in the corresponding longitudinal hole.

Instead of forming the central part 6 with variable longitudinal adjustment, it is also possible to provide different central parts 6 the extent of which in the x-direction is different. It is then only necessary to use the appropriate central part to construct the display device 1 in order to implement the desired distance of the two spectacle lenses 4, 5 and thus the positioning of the coupling-out section 28 in the x-direction.

Figure 10:
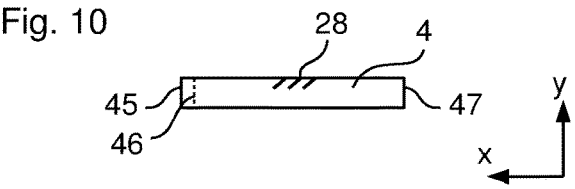
FIGS. 10-12 are schematic representations to explain the possible countersinking of the first spectacle lens.

Furthermore, it is possible to position the coupling-out section 28 in the x-direction by grinding down the side 45 facing the central part 6. This is indicated schematically in FIG. 10 by the dotted line 46. Furthermore, it is possible to grind down the side 47 facing away from the central part, as is indicated by the dotted line 48. In this case, the coupling-in is preferably carried out not via the end face of the first spectacle lens 4 but via the rear side 27.

Figure 12:
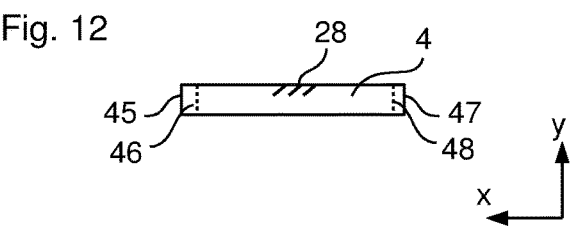

Of course, it is also possible to grind down both sides 45, 47 correspondingly, as is indicated schematically in FIG. 12. By countersinking the spectacle lens in the corresponding mount or the frame 2 in this way, the desired adjustment of the display device 1 for the specific user can take place.

Figure 13:
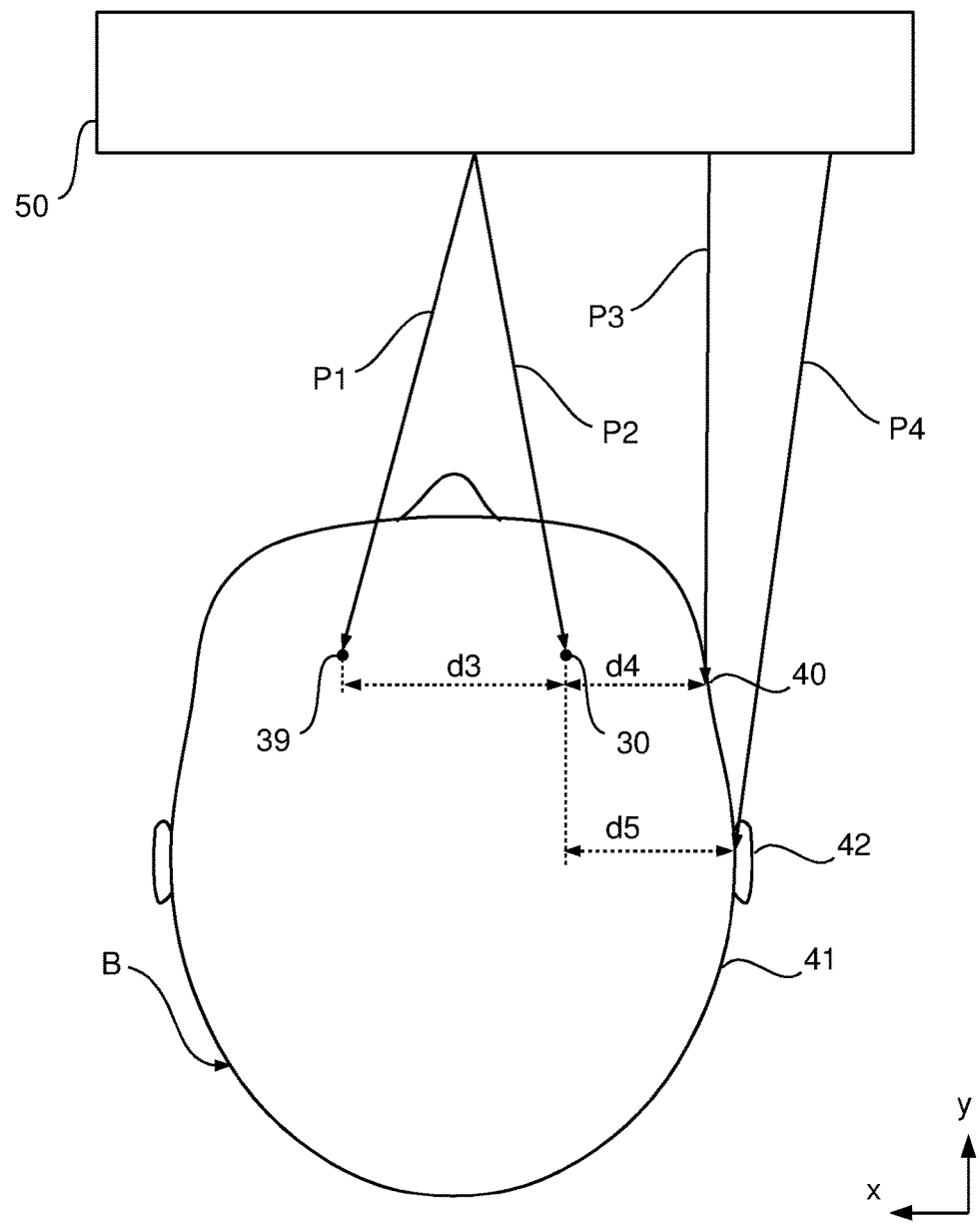
FIG. 13 is a schematic representation to explain the measurement of different distances on the head of the user.

In FIG. 13, a measuring device 50 is represented schematically, with which the interpupillary distance d3, the distance d4 and/or the distance d5 can be measured. This is indicated schematically by the arrows P1, P2, P3 and P4.

The measuring device 50 can ascertain the distances d3, d4 and/or d5 on the basis of suitable measurements.

Figure 11:
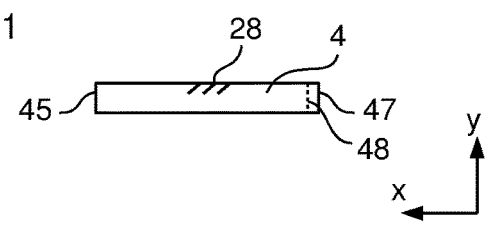

In particular, on the basis of the measurements, the measuring device 50 can propose e.g. straight away the suitable first spectacle lens 4 from an available set of spectacle lenses 4 which differ by the distance between coupling-in section 32 and coupling-out section 28. The same applies to the variant with central parts 6 of different widths. In particular, the measuring device 50 can also give suitable machining instructions in order, e.g., to be able to countersink the spectacle lens 4 according to FIGS. 10 to 12 or adjust the distance by means of the central part 6.

This described selection or this described way of proposing can alternatively be carried out by a separate device (not shown) which is supplied with at least one value for one of the distances d3-d5. This can be a measured value or a value obtained by another means.

In the embodiments of the display device 1 described hitherto, the reflection of the virtual image into the user's field of view takes place through the first spectacle lens 4. Of course, a reflection through the second spectacle lens 5 is also possible. In addition, the display device 1 can be formed such that items of information or virtual images are reflected in via both spectacle lenses 4, 5. The reflection can take place in such a way that a three-dimensional image impression results. However, this is not absolutely necessary. The spectacle lenses 4, 5 can have a refractive power of zero or a refractive power different from zero, in particular for correcting vision defects. As is shown in particular in FIGS. 2 and 6 to 8, both the front side 26 and the rear side 27 of the first and/or second spectacle lens 4, 5 can be formed curved. In particular, the front side 26 can be spherically curved. If the spectacle lens 4, 5 has a refractive power different from zero, in order to correct defective vision, as a rule the curvature of the rear side 28 is chosen appropriately in order to achieve the desired correction.

The adjustment method according to the invention is then carried out in the same way for the second spectacle lens 5 or for both spectacle lenses 4, 5.

In the display device according to the invention, the imaging unit 20, the optical element 22 and the control unit 24 can be arranged in the first temple 13 and/or second temple 15.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A method for adjusting a display device, wherein the display device comprises a holder that can be fitted on the head of a user, the holder comprising a front section in which two spectacle lenses are arranged which are connected to each other via a central part, an imaging unit secured to the holder, which generates an image, and an imaging optical system secured to the holder which, when the holder is fitted on the head of the user, images the generated image into an exit pupil such that the user can perceive it as a virtual image with his first eye, wherein the first spectacle lens is part of the imaging optical system and the generated image is guided in the first spectacle lens and is coupled out of the first spectacle lens via a coupling-out section, the adjusting method comprising:
   positioning the first spectacle lens with the coupling-out section such that the exit pupil of the imaging optical system coincides at least partially with the pupil of the first eye of the user when the holder is fitted on the head of the user,
   wherein the step of positioning of the first spectacle lens is carried out in dependence on a measurement parameter for the distance between the first eye of the user and the associated temple of the user.

2. The adjustment method according to claim 1, wherein the exit pupil is arranged along a first direction which runs from a first to a second lateral end of the front section by the positioning of the first spectacle lens.

3. The adjustment method according to claim 1, wherein the step of positioning includes:
   selecting a first spectacle lens from a set of first spectacle lenses which in each case comprise a coupling-in section via which the generated image can be coupled into the respective first spectacle lens, and which differ by different distances of the coupling-out section from the coupling-in section; and
   securing the selected first spectacle lens in the front section.

4. The adjustment method according to claim 1, wherein the step of positioning includes grinding down a lateral edge of the first spectacle lens.

5. The adjustment method according to claim 1, wherein the step of positioning includes altering the distance between the two spectacle lenses.

6. The adjustment method according to claim 1, wherein the step of positioning includes:
   selecting the front section from a set of front sections which differ from one another by the predetermined distance which the spectacle lenses have when they are arranged therein; and
   arranging the first spectacle lens in the selected front section.

7. The adjustment method according to claim 1, wherein the step of positioning includes:
   selecting the central part from a set of central parts which differ by the predetermined distance which the spectacle lenses have when they are connected to the central part; and
   connecting the two spectacle lenses to the selected central part.

8. The adjustment method according to claim 1, wherein the step of positioning includes adjusting a first angle defined between a first temple, which is connected to the front section, and the front section, wherein the first angle is present when the user is wearing the display device on the user's head.

9. The adjustment method according to claim 1, wherein the step of positioning includes changing an angle which the two spectacle lenses form.

10. The adjustment method according to claim 1, further comprising performing a measurement on the user in order to ascertain the value of the measurement parameter.

* * * * *